US007635966B2

(12) United States Patent
Butler

(10) Patent No.: US 7,635,966 B2
(45) Date of Patent: Dec. 22, 2009

(54) BARRIER MOVEMENT OPERATOR BATTERY BACKUP AND POWER EQUIPMENT BATTERY CHARGING CENTER

(75) Inventor: Brian Frederic Butler, Chicago, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 341 days.

(21) Appl. No.: 11/477,334

(22) Filed: Jun. 28, 2006

(65) Prior Publication Data

US 2008/0007210 A1 Jan. 10, 2008

(51) Int. Cl.

*H02J 7/00* (2006.01)
*H04B 1/38* (2006.01)
*H02J 1/00* (2006.01)
*G08B 13/08* (2006.01)
*B60K 1/00* (2006.01)

(52) U.S. Cl. ......................... 320/109; 320/106; 307/63; 340/545.1; 104/34; 191/2; 191/3; 414/281

(58) Field of Classification Search ................. 320/109; 340/545.1; 455/573
See application file for complete search history.

(56) References Cited

U.S. PATENT DOCUMENTS 5,781,107 A * 7/1998 Ji ............................ 340/545.1
7,002,312 B2 * 2/2006 Wojciak, Jr. ................ 318/452
2002/0180600 A1 * 12/2002 Kirkland et al. .......... 340/545.1

* cited by examiner

*Primary Examiner*—Edward Tso
*Assistant Examiner*—Yalkew Fantu
(74) *Attorney, Agent, or Firm*—Fitch Even Tabin & Flannery

(57) ABSTRACT

A system includes a rechargeable battery backup for a barrier movement operator. A barrier movement operator controls the movement of a moveable barrier. The barrier movement operator has a head unit to command the moveable barrier to perform moveable barrier functions. The head unit is supplied power by a power source. A battery charging station is in electrical communication with at least one rechargeable battery and in electrical communication with the head unit to supply power to the at least one rechargeable battery. Circuitry is electrically connected to the battery charging station to supply power from the at least one rechargeable battery to the head unit. The system also includes electrically powered equipment comprising an apparatus for receiving the at least one rechargeable battery. The electrically powered equipment is adapted to be powered by the at least one rechargeable battery to perform a predetermined function.

22 Claims, 5 Drawing Sheets

BARRIER MOVEMENT OPERATOR BATTERY BACKUP AND POWER EQUIPMENT BATTERY CHARGING CENTER

TECHNICAL FIELD

This invention relates generally to rechargeable backup batteries, and more particularly to a rechargeable battery backup for use with both a barrier movement operator and electrically powered equipment such as a power tool.

BACKGROUND

Various remotely controllable access control mechanisms are known, including barrier movement operators for movable barriers including, but not limited to, single and segmented garage doors, pivoting and sliding doors and cross-arms, rolling shutters, and the like. In general, each such system includes a primary barrier control mechanism. The latter couples in an appropriate way to a corresponding barrier and causes the barrier to move (typically between closed and opened positions).

Barrier movement operators, such as garage door openers, are often powered via an electrical outlet. In the event of a power outage, however, many of the garage door openers are unable to open or close a garage door. Instead, such garage doors must be manually opened and closed. This can be problematic for children or disabled people attempting to manually move these garage doors.

Some current barrier movement operators can be powered via a backup battery. These barrier movement operators receive power from the backup battery in the event of a power disruption from the electrical outlet and can be operated as long as the backup battery has a sufficient amount of electrical power stored.

These battery backups are independent items which are typically used only for operating the barrier movement operator. These systems require some method to recharge the batteries either built into the operator or as an additional power supply for battery charging.

Cordless power tools also require batteries and recharging systems. Cordless power tools include tools such as saws, drills, lights, and garden tools. Usually the battery is a plug-in device which is removed from the tool to charge in a separate cradle. This cradle is typically designed only to recharge the battery. It is often expensive, however, to use separate batteries for electrically powered tools and for the barrier movement operators.

SUMMARY OF THE INVENTION

The present invention is directed to a system including a rechargeable battery backup for a barrier movement operator. The barrier movement operator controls the movement of a moveable barrier. The barrier movement operator has a head unit to command the moveable barrier to perform moveable barrier functions. The head unit is supplied power by a power source. A battery charging station is in electrical communication with at least one rechargeable battery and in electrical communication with the head unit to supply power to the at least one rechargeable battery. Circuitry is electrically connected to the battery charging station to supply power from the at least one rechargeable battery to the head unit. The system also includes electrically powered equipment comprising an apparatus for receiving the at least one rechargeable battery. The electrically powered equipment is adapted to be powered by the at least one rechargeable battery to perform a predetermined function.

The present invention is further directed to a battery charging apparatus. A battery charging station is in electrical communication with a rechargeable battery and in electrical communication with a head unit of a barrier movement operator for supplying power to at least one rechargeable battery. The at least one rechargeable battery is removably connectable to electrically powered equipment to provide power to the electrically powered equipment. Circuitry is electrically connected to the battery charging station to supply power from the at least one rechargeable battery to the head unit.

The present invention is also directed to a method of power flow between at least one rechargeable battery, electrically powered equipment, and a barrier movement operator. A determination is made regarding whether the at least one rechargeable battery is in electrical communication with a battery charging station. Power is provided from a power source to the at least one rechargeable battery via the battery charging station. Stored power is provided from the at least one rechargeable battery to the head unit via the battery charging station to perform movable barrier functions. Power is also provided from the at least one rechargeable battery to the electrically powered equipment in response to the at least one rechargeable battery being electrically connected to the electrically powered equipment.

The present invention is further directed to a kit having several items, including a rechargeable battery. A barrier movement operator is provided for controlling movement of a moveable barrier. The barrier movement operator has a head unit to command the moveable barrier to perform moveable barrier functions in response to electrical means and in response to the rechargeable battery. A battery charging station supplies power to at least one rechargeable battery. Electrically powered equipment is adapted to be powered by the at least one rechargeable battery to perform a predetermined function. Circuitry is electrically connected to the battery charging station. A set of instructions is provided for the connecting of the circuitry and the battery charging station.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The above needs are at least partially met through provision of the method and apparatus for remote control described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a rechargeable battery backup is provided for use with a barrier movement operator. The barrier movement operator normally receives power from a power source such as an electrical outlet. In the event, however, of a power disruption such as a power outage, the rechargeable battery backup may provide power to the barrier movement operator to allow the barrier movement operator to move a movable barrier. For example, the movable barrier may be a garage door. The rechargeable battery backup may be inserted in a battery charging station. In some embodiments, the battery charging station may allow receipt of multiple rechargeable backup batteries. In other embodiments, a single rechargeable battery may be utilized. Circuitry is electrically connected to the battery charging station and may electrically connect the rechargeable backup battery to the barrier movement operator in the event of a power failure. The circuitry may also electrically connect the battery charging station to a power source to charge the rechargeable battery backup in the event that the rechargeable battery backup is not fully charged. The power source may be the same power source that normally supplies power to the barrier movement operator.

The rechargeable battery backup may be electrically connected to the battery charging station by, for example, manual insertion into a sleeve or other battery receiving portion of the battery charging station. The rechargeable battery backup may also be utilized to power other devices such as electrically powered equipment. The electrically powered equipment may comprise, for example, a tool. The electrically powered equipment may be a saw, drill, light, garden tool, or any other equipment or tool which is capable of being powered by a battery. The rechargeable battery backup may be manually removed from the battery charging station and inserted into the electrically powered equipment. After the electrically powered equipment has been utilized, the rechargeable battery backup may be removed from the electrically powered equipment and reinserted into the battery charging station.

Figure 1:
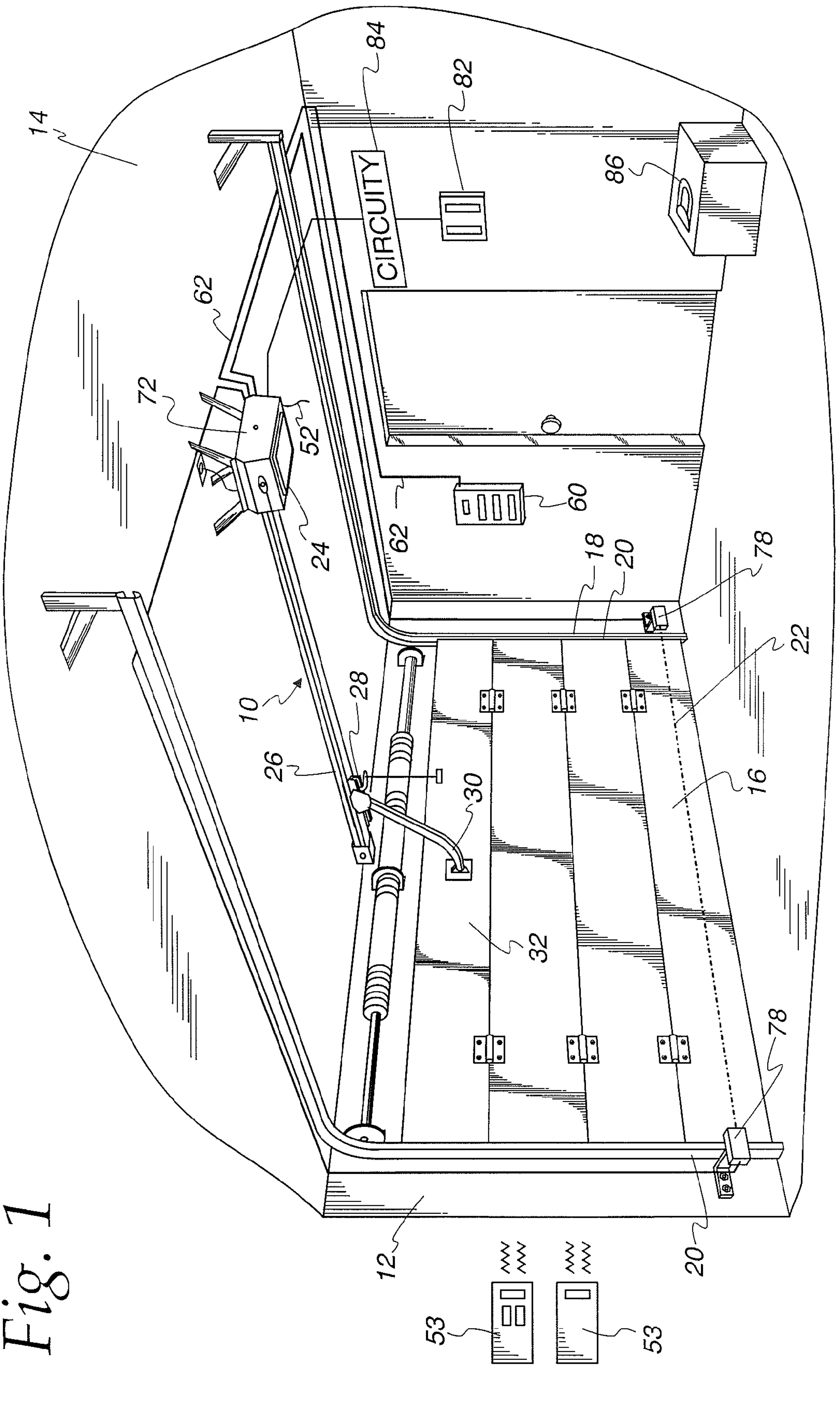
FIG. 1 is a perspective view of a garage including a barrier movement operator, specifically a garage door operator, having associated with it a passive infrared detector in a wall control unit and embodying the present invention.

Referring now to drawings and especially to FIG. 1, a barrier movement operator embodying the present invention is shown therein and generally identified by reference numeral 10. The barrier movement operator, in this embodiment a garage door operator 10, is positioned within a garage 12. More specifically, it is mounted to a ceiling 14 of the garage 12 for operation, in this embodiment, of a multipanel garage door 16. The multipanel garage door 16 includes a plurality of rollers 18 rotatably confined within a pair of tracks 20 positioned adjacent to and on opposite sides of an opening 22 for the garage door 16.

The garage door operator 10 also includes a head unit 24 for providing motion to the garage door 16 via a rail assembly 26. The rail assembly 26 includes a trolley 28 for releasable connection of the head unit 24 to the garage door 16 via an arm 30. The arm 30 is connected to an upper portion 32 of the garage door 16 for opening and closing it. The trolley 28 is connected to an endless chain to be driven thereby. The chain is driven by a sprocket in the head unit 24. The sprocket acts as a power takeoff for an electric motor located in the head unit 24.

Figure 2:
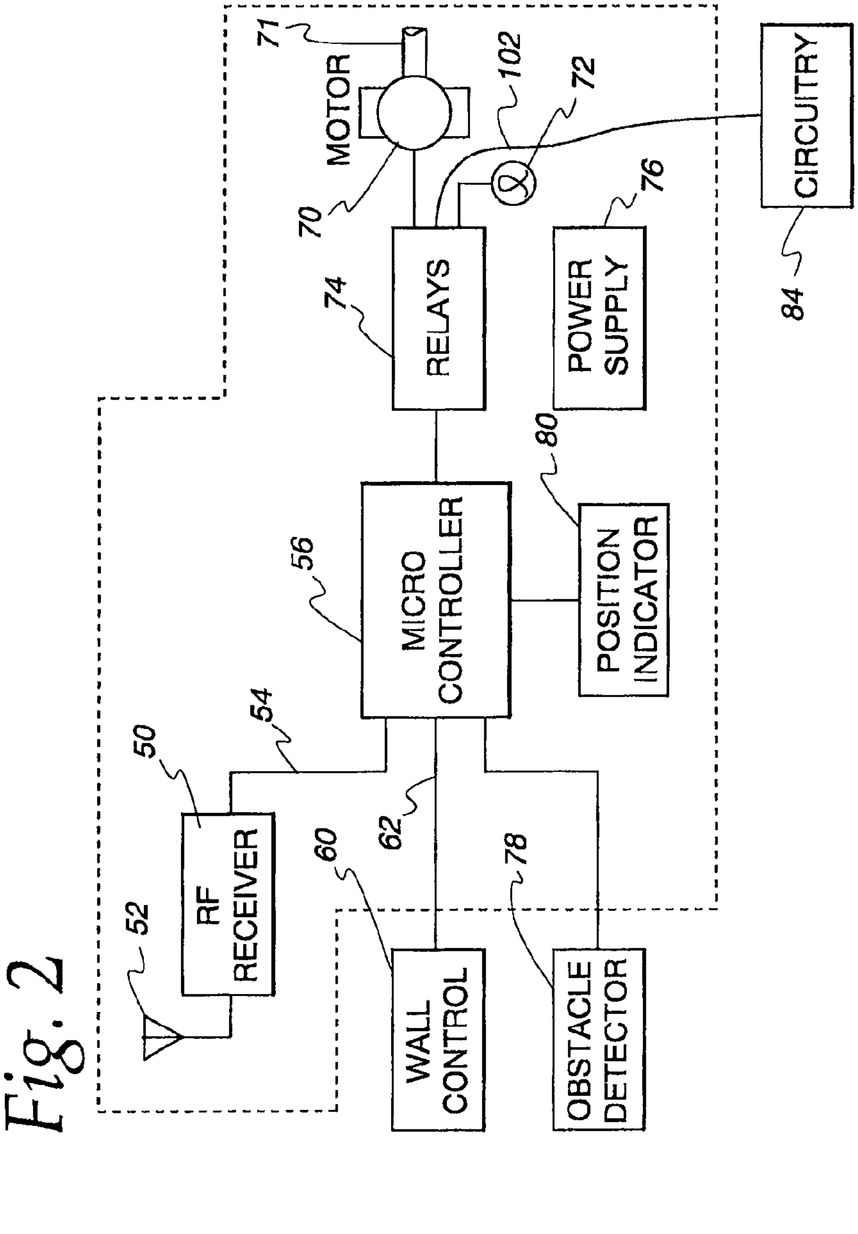
FIG. 2 is a block diagram showing the relationship between major electrical systems of a portion of the garage door operator shown in FIG. 1.

The head unit 24 includes a radio frequency receiver 50, as may best be seen in FIG. 2, having an antenna 52 associated with it for receiving coded radio frequency transmissions from one or more radio transmitters 53 which may include portable or keyfob transmitters or keypad transmitters. The radio receiver 50 is connected via a line 54 to a microcontroller 56 which interprets signals from the radio receiver 50 as code commands to control other portions of the garage door operator 10.

A wall control unit 60 communicates over a line 62 with the head unit microcontroller 56 to effect control of a garage door operator motor 70, and a light 72 via relay logic 74 connected to the microcontroller 56. The entire head unit 24 is powered from a power supply 76. In addition, the garage door operator 10 includes an obstacle detector 78 which optically or via an infrared pulsed beam detects when the garage door opening 22 is blocked and signals the microcontroller 56 of the blockage. The microcontroller 56 then causes a reversal or opening of the door 16. In addition, a position indicator 80 indicates to the head unit microcontroller 56, through at least part of the travel of the door 16, the door position so that the microcontroller 56 can control the close position and the open position of the door 16 accurately. A battery charging station 82 is in electrical communication with the power supply 76 via circuitry 84, as discussed below with respect to FIGS. 3 and 4. The battery charging station 82 may be utilized to recharge one removable rechargeable battery, or multiple removable rechargeable batteries, depending on the application. The battery charging station 82 may receive power to charge the removable rechargeable battery directly from the power supply 76, which may comprise an electrical outlet. Alternatively, the removable rechargeable battery may be charged by the head unit 24, which itself is powered by the power supply 76. The removable rechargeable battery may be manually removed and inserted into electrically powered equipment 86, such as the illustrated chainsaw of FIG. 1.

Figure 3:
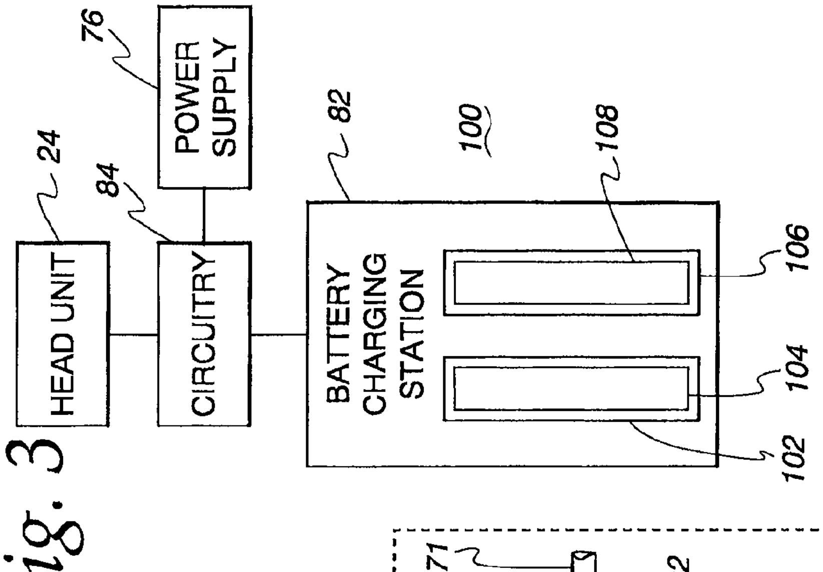
FIG. 3 illustrates a power supply system according to at least one embodiment of the invention.

FIG. 3 illustrates a power supply system 100 according to at least one embodiment of the invention. As shown, the power supply system 100 includes the circuitry 84, the power supply 76, and the battery charging station 82. The circuitry 84 is also in communication with the head unit 24 of the barrier movement operator 10. The battery charging station 82 includes a first receptacle 102 for receiving a first removable rechargeable battery 104 and a second receptacle 106 for receiving a second removable rechargeable battery 108. When the first removable rechargeable battery 104 is located in the first receptacle 102 and the second removable rechargeable battery 108 is located in the second receptacle 106, the first removable rechargeable battery 104 and the second removable rechargeable battery 108 may be charged with power supplied by the power supply 76. The circuitry 84 may control the flow of power between the power supply 76 and the battery charging station 82, and between the battery charging station 82 and the head unit 24 of the barrier movement operator 10.

In the event that the power supply 76 is supplying sufficient power to the barrier movement operator 10, the circuitry 84 allows power from the power supply 76 to flow to the battery charging station 82 where it flows into the first removable rechargeable battery 104 and the second removable rechargeable battery 108. It should be appreciated that the battery charging station 82 may hold more or fewer than two removable rechargeable batteries, depending on the application.

In the event of an interruption of the supply of power from the power supply 76, the circuitry 84 may couple the battery charging station 82 to the head unit 24 of the barrier movement operator 10, such that the first removable rechargeable battery 104 and the second removable rechargeable battery 108 may provide power to permit the barrier movement operator 10 to function as though there had been no power supply 76 disruption.

Figure 4:
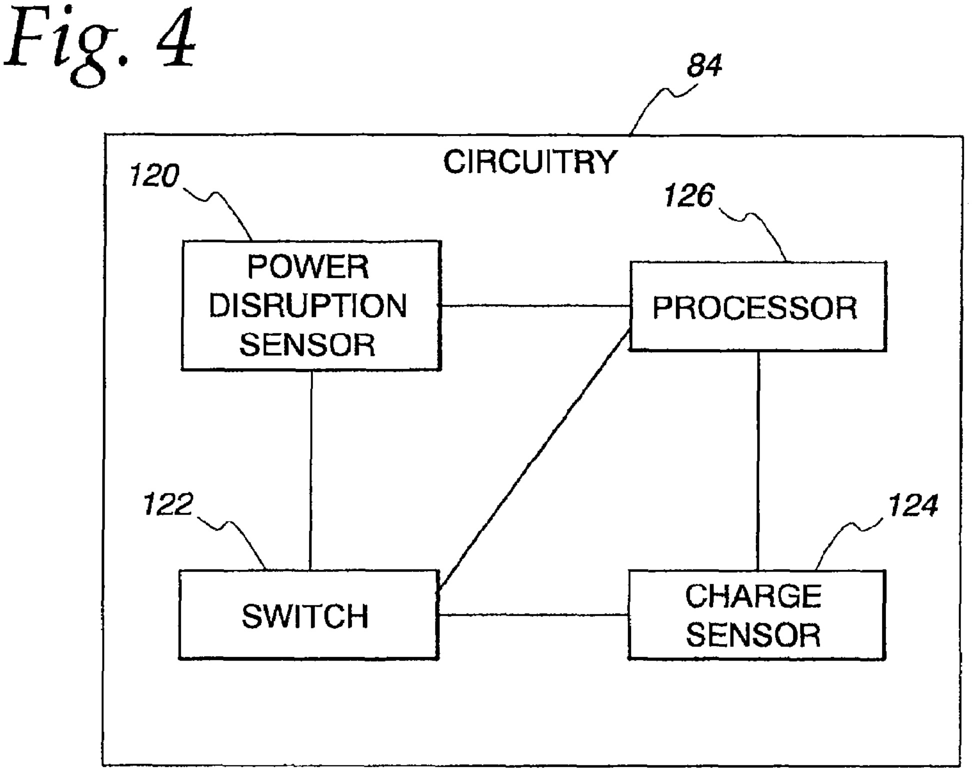
FIG. 4 illustrates the circuitry according to at least one embodiment of the invention.

FIG. 4 illustrates the circuitry 84 according to at least one embodiment of the invention. As shown, the circuitry 84 includes a power disruption sensor 120, a switch 122, and a charge sensor 124. The power disruption sensor 120 detects whether the power supply 76 is supplying power to the barrier movement operator 10. The charge sensor 124 detects whether any removable rechargeable batteries placed in the battery charging station 82, such as the first removable rechargeable battery 104 and the second removable rechargeable battery 108, are fully charged. The switch 122 is utilized to control the flow of power to and from the battery charging station 82. The circuitry 84 may also include a processor 126 to control the switch 122. Alternatively, the circuitry 84 may include some other logic to control operation of the switch 122.

In the event that the power supply 76 is supplying sufficient power and the first removable rechargeable battery 104 and the second removable rechargeable battery 108 are fully charged, the switch 122 may be open such that power from the power supply 76 is not supplied to the fully charged first removable rechargeable battery 104 and second removable rechargeable battery 108. Alternatively, in the event that the power supply 76 is supplying sufficient power and the first removable rechargeable battery 104 and the second removable rechargeable battery 108 are not fully charged, the switch 122 may be positioned such that power from the power supply 76 is supplied to charge the first removable rechargeable battery 104 and the second removable rechargeable battery 108. In another example, in the event that there is a disruption of power from the power supply 76 to the barrier movement operator 10, the switch 122 may positioned such that the stored power from the first removable rechargeable battery 104 and the second removable rechargeable battery 108 is provided to the barrier movement operator 10 to allow the barrier movement operator 10 to function.

Figure 5:
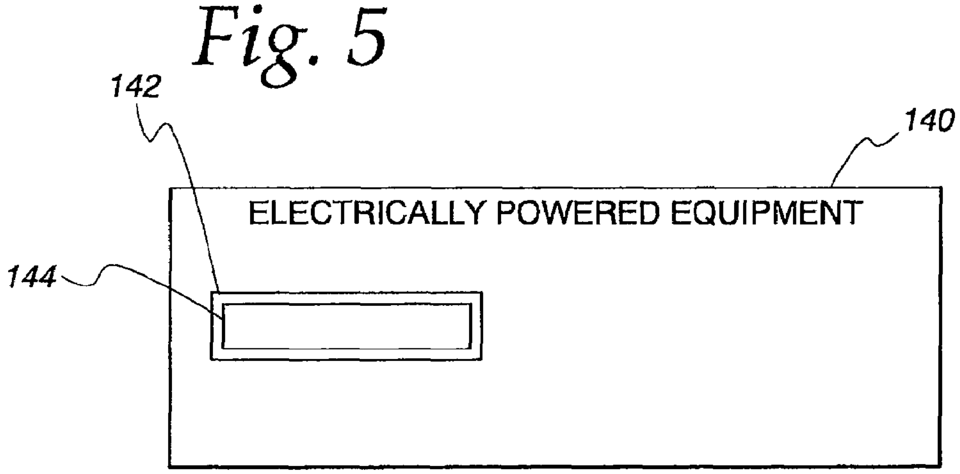
FIG. 5 illustrates electrically powered equipment according to at least one embodiment of the invention.

FIG. 5 illustrates electrically power equipment 140 according to at least one embodiment of the invention. The electrically powered equipment 140 may comprise a saw, drill, light, garden tool, or any other equipment or tool which is capable of being powered by a battery, as discussed above. As illustrated, the electrically power equipment 140 includes a battery receptacle 142 for receiving a removable rechargeable battery 144, such as the first removable rechargeable battery 104 or the second removable rechargeable battery 108 discussed above with respect to FIG. 3. The electrically powered equipment 140 may also optionally include a power cord for plugging into an electrical outlet. In the event that a user decides to utilize the electrically powered equipment 140, the user may remove a removable rechargeable battery 144 from the battery charging station 82 and insert it into the battery receptacle 142. After the user is finished with the electrically powered equipment 140, the user may remove the removable rechargeable battery 144 from the battery receptacle 142 and place it back in the battery charging station 82 to be recharged.

Figure 6:
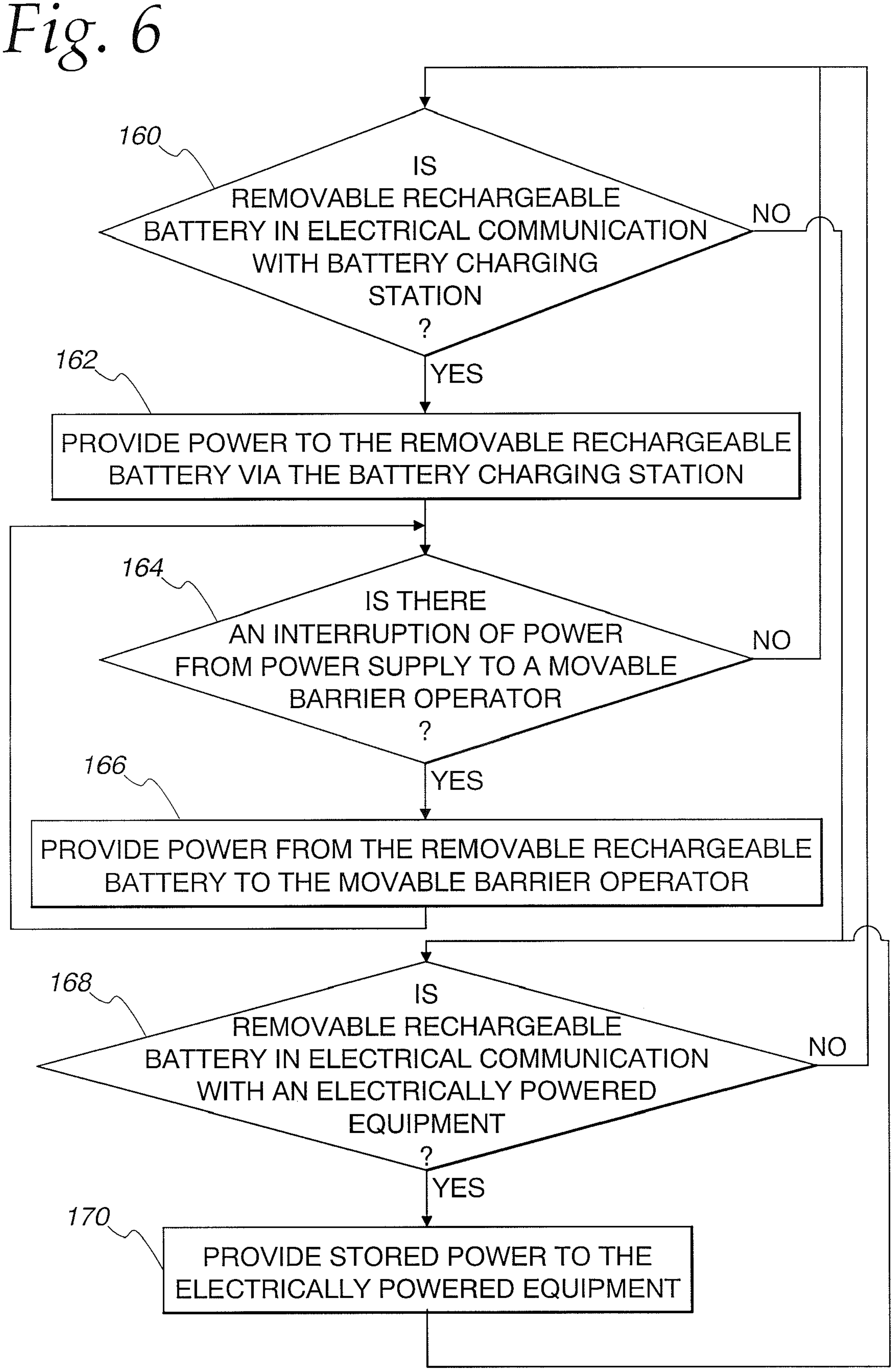
FIG. 6 illustrates a method of utilizing a removable rechargeable battery according to an embodiment of the invention.

FIG. 6 illustrates a method of utilizing the removable rechargeable battery 144 according to an embodiment of the invention. First, at operation 160, a determination is made as to whether the removable rechargeable battery 144 is in electrical communication with the battery charging station 82. If "yes," processing proceeds to operation 162, where power is provided to the removable rechargeable battery 144 via the battery charging station 82. If "no" at operation 160, processing proceeds to operation 168. At operation 164, a determination is made regarding whether there is an interruption of power from a power supply to the barrier movement operator 10. If "yes," processing proceeds to operation 166 where power from the removable rechargeable battery 144 is provided to the barrier movement operator 10. Processing subsequently proceeds to operation 164. If "no" at operation 164, on the other hand, processing returns to operation 160.

At operation 168, a determination is made as to whether the removable rechargeable battery 144 is in electrical communication with the electrically powered equipment 140. If "yes," processing proceeds to operation 170 where stored power from the removable rechargeable battery 144 is provided to the electrically powered equipment 140, and then processing returns to operation 168. If "no" at operation 168, processing returns to operation 160. The method illustrated in FIG. 6 may be implemented by logic or the processor within the circuitry 84.

Figure 7:
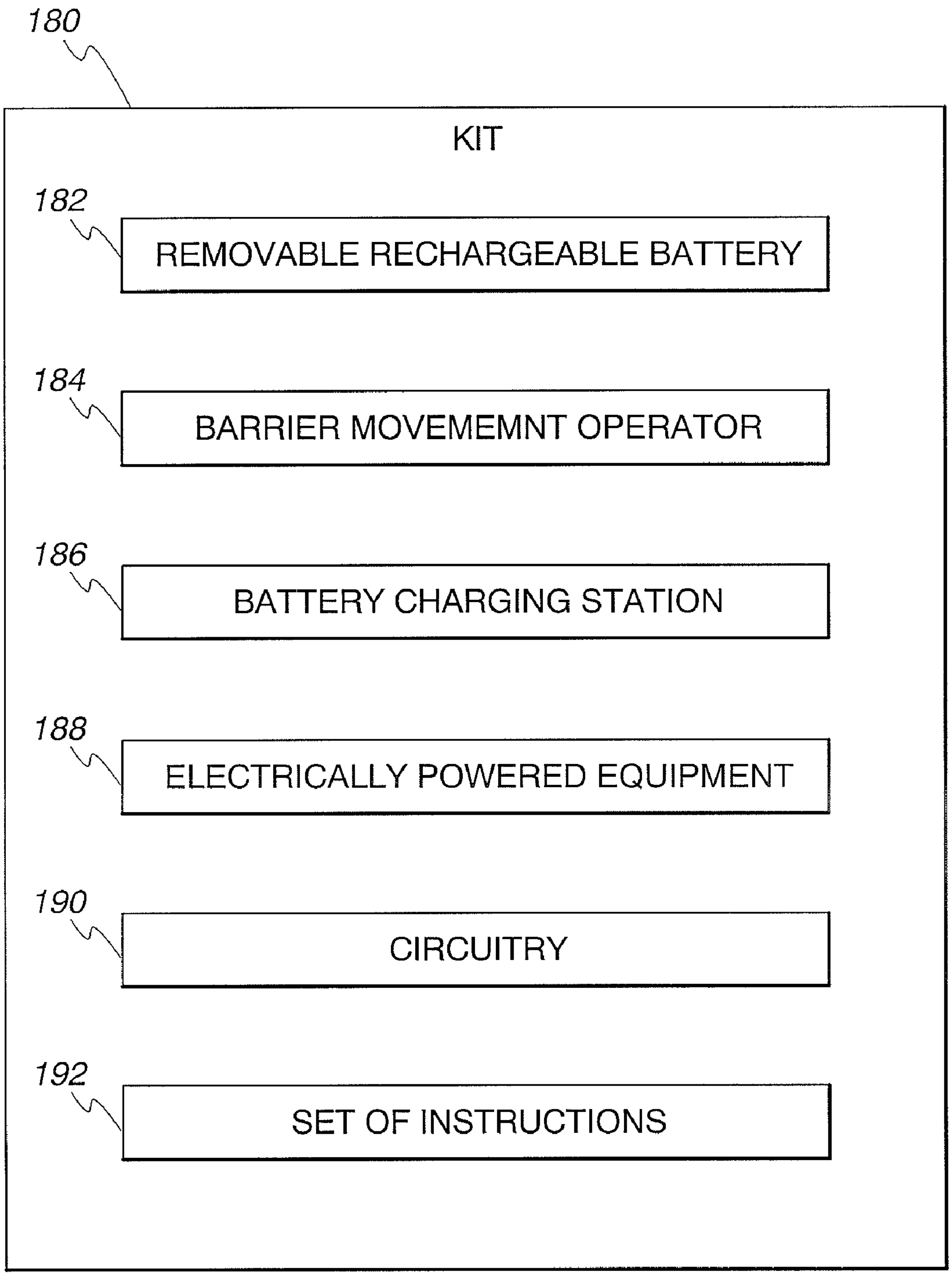
FIG. 7 illustrates a kit according to at least one embodiment of the invention.

FIG. 7 illustrates a kit 180 according to at least one embodiment of the invention. The kit 180 may be sold to a user in, for example, a hardware or department store. The kit 180 includes a removable rechargeable battery 182. Alternatively, the kit 180 may include multiple removable rechargeable batteries 182. The kit also includes a barrier movement operator 184, a battery charging station 186, electrically powered equipment 188, circuitry 190, and a set of instructions 192. The set of instructions 192 may include assembly instructions regarding how to connect the barrier movement operator 184, the battery charging station 186, and the circuitry 190. The set of instructions 192 may also include instructions regarding how to insert the removable rechargeable battery 182 into both the battery charging station 186 and the electrically powered equipment 188.

The various embodiments described above provide a rechargeable battery backup for use with a barrier movement operator. The barrier movement operator normally receives power from a power source such as an electrical outlet. In the event, however, of a power disruption such as a power outage, the rechargeable battery backup may provide power to the barrier movement operator to allow the barrier movement operator to move a movable barrier. The rechargeable battery backup may be inserted in a battery charging station. In some embodiments, the battery charging station may allow receipt of multiple rechargeable backup batteries. In other embodiments, a single rechargeable battery may be utilized. Circuitry is electrically connected to the battery charging station and may electrically connect the rechargeable backup battery to the barrier movement operator in the event of a power failure. The circuitry may also electrically connect the battery charging station to a power source to charge the rechargeable backup battery in the event that the rechargeable battery backup is not fully charged. The power source may be the same power source that normally supplies power to the barrier movement operator.

The rechargeable battery backup may be electrically connected to the battery charging station by, for example, manual insertion into a sleeve or other battery receiving portion of the battery charging station. The rechargeable battery backup may also be utilized to power other devices such as electrically powered equipment. The electrically powered equipment may comprise, for example, a saw, drill, light, garden tool, or any other equipment or tool which is capable of being powered by a battery. The rechargeable battery backup may be manually removed from the battery charging station and inserted into the electrically powered equipment. After the electrically powered equipment has been utilized, the rechargeable battery backup may be removed from the electrically powered equipment and reinserted into the battery charging station.

By providing a rechargeable battery backup that can be used with both a barrier movement operator and an electrically powered equipment, instead of having to have separate batteries for both of these, a user can minimize the number of batteries needed to keep on hand. Also, a single battery charging station can be used for charging the rechargeable battery backup, instead of two separate battery charging stations or cradles as is required according to current system. Therefore, the user can conserve available space by simply using a single battery charging station.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A system for providing a rechargeable battery backup for a barrier movement operator, comprising:

a barrier movement operator for controlling the movement of a moveable barrier, the barrier movement operator having a head unit to command the moveable barrier to perform moveable barrier functions, wherein the head unit is supplied power by a power source;

a battery charging station in electrical communication with at least one rechargeable battery and in electrical communication with the head unit to supply power to the at least one rechargeable battery;

circuitry electrically connected to the battery charging station to supply power from the at least one rechargeable battery to the head unit; and electrically powered equipment other than and physically separate or separable from the barrier movement operator comprising an apparatus for receiving the at least one rechargeable battery and to be powered by the at least one rechargeable battery to perform a predetermined function.

2. The system of claim 1, wherein the rechargeable battery is removably connectable to the electrically powered equipment.

3. The system of claim 1, wherein the head unit is in communication with the battery charging station via a cord.

4. The system of claim 1, further comprising an indication element to notify a user in response to at least one of:

the at least one rechargeable battery being removed from the battery charging station, and the stored power of the at least one rechargeable battery being below a threshold amount.

5. The system of claim 4, wherein the indication element comprises at least one of an audible indicator and a visual indicator.

6. The system of claim 1, wherein the barrier movement operator is selected from the group consisting of: a garage door operator, a gate operator, and a commercial door operator.

7. The system of claim 1, wherein the at least one rechargeable battery comprises at least two rechargeable batteries.

8. The system of claim 1, wherein the electrically powered equipment comprises a tool.

9. A battery charging apparatus, comprising:

a battery charging station in electrical communication with a rechargeable battery and in electrical communication with a head unit of a barrier movement operator for supplying power to at least one rechargeable battery, the at least one rechargeable battery being removably connectable to electrically powered equipment other than and physically separate or separable from the barrier movement operator to provide power to the electrically powered equipment; and circuitry electrically connected to the battery charging station to supply power from the at least one rechargeable battery to the head unit.

10. The battery charging apparatus of claim 9, wherein the head unit is in communication with the battery charging station via a cord.

11. The battery charging apparatus of claim 9, further comprising an indication element to notify a user in response to at least one of:

the at least one rechargeable battery being removed from the battery charging station, and the stored power of the at least one rechargeable battery being below the threshold amount.

12. The battery charging apparatus of claim 9, wherein the indication element comprises at least one of an audible indicator and a visual indicator.

13. The battery charging apparatus of claim 9, wherein the at least one rechargeable battery comprises at least two rechargeable batteries.

14. The battery charging apparatus of claim 9, wherein the electrically powered equipment comprises a tool.

15. A method of power flow between at least one rechargeable battery, a barrier movement operator, electrically powered equipment other than and physically separate or separable from the barrier movement operator, the method comprising:

detecting whether the at least one rechargeable battery is in electrical communication with a battery charging station;

providing power from a power source to the at least one rechargeable battery via the battery charging station;

providing stored power from the at least one rechargeable battery to the head unit via the battery charging station to perform movable barrier functions; and providing power from the at least one rechargeable battery to the electrically powered equipment in response to the at least one rechargeable battery being electrically connected to the electrically powered equipment.

16. The method of claim 15, further comprising notifying a user in response to at least one of:

the at least one rechargeable battery being removed from the battery charging station, and the stored power of the at least one rechargeable battery being below the threshold amount.

17. The method of claim 16, wherein notifying comprises generating at least one of an audible indication and a visual indication.

18. The method of claim 15, wherein the electrically powered equipment comprises a tool.

19. A kit comprising:

a barrier movement operator for controlling movement of a moveable barrier, the barrier movement operator having a head unit to command the moveable barrier to perform moveable barrier functions in response to electrical means and in response to at least one separable rechargeable battery;

a battery charging station configured to supply power to the at least one separable rechargeable battery that is configured to separably and electrically connect to and power electrically powered equipment other than and physically separate or separable from the barrier movement operator;

circuitry electrically connected to the battery charging station; and a set of instructions for the connecting of the circuitry and the battery charging station.

20. The kit of claim 19, wherein the electrically powered equipment comprises a tool.

21. The kit of claim 19, further comprising the at least one separable rechargeable battery.

22. The kit of claim 19, further comprising the electrically powered equipment other than and physically separate or separable from the barrier movement operator.

* * * * *

UNITED STATES PATENT AND TRADEMARK OFFICE

CERTIFICATE OF CORRECTION

PATENT NO. : 7,635,966 B2
APPLICATION NO. : 11/477334
DATED : December 22, 2009
INVENTOR(S) : Brian Frederic Butler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Ninth Day of November, 2010

David J. Kappos

*Director of the United States Patent and Trademark Office*